(12) United States Patent
Sato et al.

(10) Patent No.: US 10,205,857 B2
(45) Date of Patent: Feb. 12, 2019

(54) IMAGE PICKUP DEVICE WITH LAND LAYOUT THAT ENABLES RELIABLE SOLDERING, AND MOUNTING BOARD THEREFOR

(71) Applicant: CANON KABUSHIKI KAISHA, Tokyo (JP)

(72) Inventors: Yohei Sato, Tokyo (JP); Yutaka Kojima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 15/646,569

(22) Filed: Jul. 11, 2017

(65) Prior Publication Data

US 2018/0020133 A1    Jan. 18, 2018

(30) Foreign Application Priority Data

Jul. 13, 2016   (JP) .................................. 2016-138593

(51) Int. Cl.
*H04N 5/225*      (2006.01)
*B23K 1/00*       (2006.01)
*B23K 1/008*      (2006.01)

(52) U.S. Cl.
CPC ......... *H04N 5/2252* (2013.01); *B23K 1/0008* (2013.01); *H04N 5/2253* (2013.01); *B23K 1/008* (2013.01)

(58) Field of Classification Search
CPC ................ H04N 5/2252; H04N 5/2253; H01L 2224/02165; H01L 2224/0217; H01L 2224/02235; H01L 2224/0224; H01L 2224/10135; H01L 2224/10155; H01L 2224/10165; H01L 2224/11002; H01L 2224/11003; H01L 2224/11005; H01L 2224/11011; H01L 2224/26135; H01L 2224/26145; H01L 2224/26152; H01L 2224/27002; H01L 2224/40992;
(Continued)

(56) References Cited

U.S. PATENT DOCUMENTS

2003/0070288 A1\*  4/2003  Ting .................. H01L 27/14618
                                                29/832
2006/0141226 A1\*  6/2006  Takeuchi ............. H04N 5/2253
                                                428/209
(Continued)

FOREIGN PATENT DOCUMENTS

JP         2015-026822 A     2/2015

*Primary Examiner* — Nelson D. Hernández Hernández
(74) *Attorney, Agent, or Firm* — Cowan, Liebowitz & Latman, P.C.

(57) ABSTRACT

An image pickup device which ensures reliability of soldering without reinforcement using any additional special members or fixing with an adhesive agent or the like. The image pickup device outputs an image signal corresponding to an optical image. Signal terminals are placed on one surface of the image pick device and soldered to a mounting board on which the image pickup device is to be mounted. Reinforcing terminals provided on the one surface, on which the signal terminal is placed, reinforce the image pickup device. A holding fixing unit holds the image pickup device on the mounting board. When the image pickup device is mounted on the mounting board, the reinforcing terminals are located between the signal terminals and the holding fixing unit.

18 Claims, 8 Drawing Sheets

(58) Field of Classification Search
CPC ... H01L 2224/40997; H01L 2224/4899; H01L 2224/48992; H01L 2224/48997
See application file for complete search history.

(56) References Cited

U.S. PATENT DOCUMENTS

| | | | | |
|---|---|---|---|---|
| 2007/0284511 | A1* | 12/2007 | Toyoda | G02B 3/0075 |
| | | | | 250/208.1 |
| 2010/0243872 | A1* | 9/2010 | Amano | H01L 27/14618 |
| | | | | 250/238 |
| 2013/0105993 | A1* | 5/2013 | Bahadur | H01L 24/11 |
| | | | | 257/782 |
| 2014/0252607 | A1* | 9/2014 | Miyauchi | H01L 21/4853 |
| | | | | 257/737 |
| 2014/0376202 | A1* | 12/2014 | Shibutani | H01L 23/49811 |
| | | | | 361/767 |
| 2015/0043184 | A1* | 2/2015 | Odagaki | H05K 1/111 |
| | | | | 361/767 |
| 2016/0218091 | A1* | 7/2016 | Du | H01L 25/105 |

* cited by examiner

IMAGE PICKUP DEVICE WITH LAND LAYOUT THAT ENABLES RELIABLE SOLDERING, AND MOUNTING BOARD THEREFOR

BACKGROUND OF THE INVENTION

Field of the Invention

The present invention relates to an image pickup device and a mounting board therefor, and in particular to a land layout of the image pickup device.

Description of the Related Art

There has been a growing trend in recent years toward increased output terminals of an image pickup device with an increase in the number of pixels which the image pickup device holds. In general, there is known an image pickup device of a type in which metallic leg-shaped leads are placed on sides of the image pickup device and mounted on a board (hereafter referred to as the gull-wing device) is known. In the gull-wing device, it is necessary to leave a predetermined space between neighboring leads with consideration given to workability and ease of mounting in soldering the leads to the board. For this reason, if the number of output terminals increases due to an increase in the number of pixels, it would become difficult to place a required number of output terminals.

On the other hand, there is known an image pickup device with round output lands capable of being soldered and provided on a bottom thereof (hereafter referred to as the LGA-PKG). When the LGA-PKG is of a full size, solder is crushed due to its self weight, and there is a concern that shorting with a neighboring output land occurs. For this reason, maintaining external dimensions of the LGA-PKG would require a reduced diameter of the output lands, resulting in a decrease in reliability of soldering.

To address this problem, there has been a technique that place reinforcing terminals larger than output terminals on a bottom of the LGA-PKG and encloses the reinforcing terminals with enclosing members so as to increase ease of mounting and at the same time ensure reliability of soldering (see Japanese Laid-Open Patent Publication (Kokai) No. 2015-26822).

The LGA-PKG described in Japanese Laid-Open Patent Publication (Kokai) No. 2015-26822, however, would increase cost due to the reinforcing terminals enclosed by the enclosing members. Further, it is necessary to place the enclosing members and temporarily hold the enclosing members at the time of mounting, and hence the degree of difficulty in work would be increased, resulting in decreased workability.

Under the circumstances, there is a trend to use an image pickup device called an LCC-PKG, which is easier to mount and more reliable in soldering than the gull-wing type and the LGA-PKG type, as a full-size image pickup device.

With the LCC-PKG as well, however, ensuring reliability of soldering is uneasy when it is of a full size, and hence, for example, a technique that reinforces the image pickup device and a mounting board by consolidating them together using an adhesive agent or the like. However, reinforcement using an adhesive agent or the like would not only unavoidably increase work cost and decrease workability during assembly.

SUMMARY OF THE INVENTION

The present invention provides an image pickup device and a mounting board therefor which ensure reliability of soldering without reinforcement using any additional special members or fixing with an adhesive agent or the like.

Accordingly, the present invention provides an image pickup device that outputs an image signal corresponding to an optical image, comprising signal terminals configured to be placed on one surface of the image pick device and soldered to a mounting board on which the image pickup device is to be mounted, reinforcing terminals configured to be provided on the one surface, on which the signal terminal is placed, and reinforce the image pickup device, and a holding fixing unit configured to hold the image pickup device on the mounting board, wherein when the image pickup device is mounted on the mounting board, the reinforcing terminals are located between the signal terminals and the holding fixing unit.

According to the present invention, reliability of soldering is ensured without reinforcement using any additional special members or fixing with an adhesive agent or the like.

Further features of the present invention will become apparent from the following description of exemplary embodiments (with reference to the attached drawings).

DESCRIPTION OF THE EMBODIMENTS

Hereafter, an exemplary image pickup device according to an embodiment of the present invention will be described with reference to the drawings.

Figure 1A:
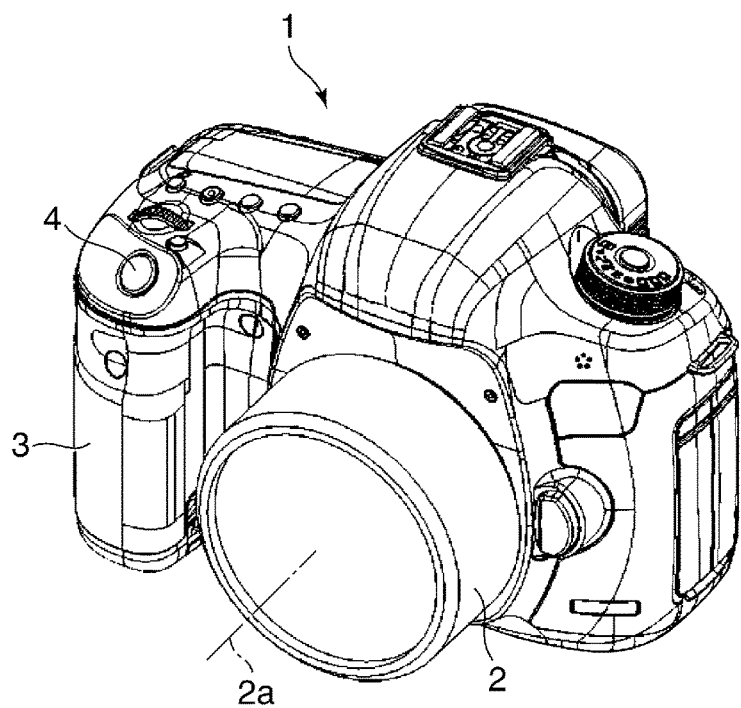
FIGS. 1A and 1B are views showing an image pickup apparatus for which an image pickup device according to an embodiment of the present invention is used.
Figure 1B:
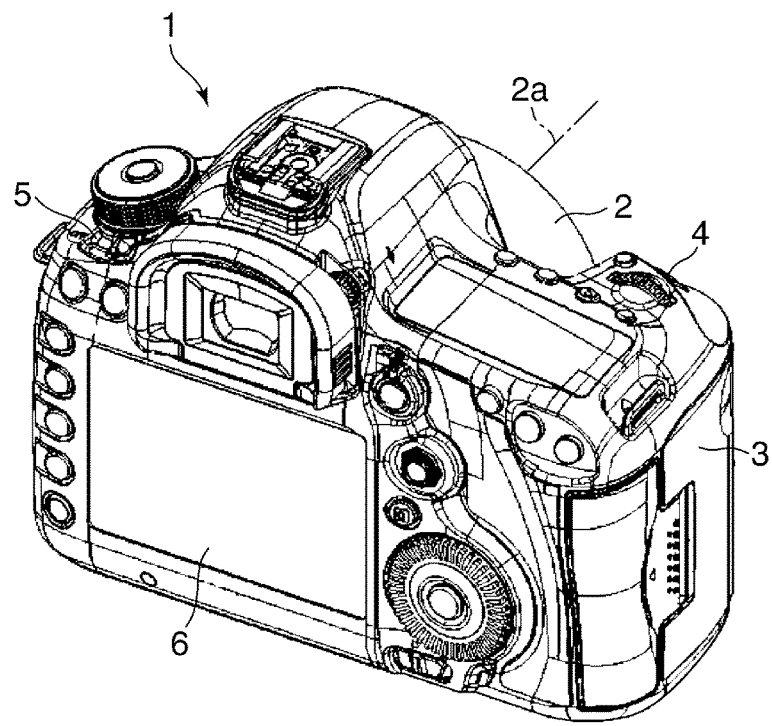

FIGS. 1A and 1B are views showing an exemplary image pickup apparatus for which the image pickup device according to the embodiment of the present invention is used. FIG. 1A is a perspective view showing an appearance of the image pickup apparatus as seen from a front side, and FIG. 1B is a perspective view showing the appearance of the image pickup apparatus as seen from a rear side.

The image pickup apparatus shown in the figures is a digital camera (hereafter referred to as the camera) and has a camera main body 1 and a taking lens unit (hereafter referred to merely as the taking lens) 2 mounted on the camera main body 1. Referring to FIG. 1A, a grip portion 3, which is to be held by a user, is formed on a left side of the camera main body 1. The grip portion 3 is molded into a convex form so that it can easily be held by the user. A release button 4 is placed on an upper surface of the grip portion 3, and the user causes the camera to start a shooting operation by operating the release button 4. It should be noted that a shooting optical axis 2a indicated by alternate long and short dashed lines is defined in a central part of the taking lens 2.

Referring to FIG. 1B, a main switch (main SW) 5 is placed on the camera main body 1, and the camera is started by operating the main SW 5. A display unit 6, on which a variety of information, images, and so forth are displayed, is placed on a rear surface of the camera main body 1.

Figure 2:
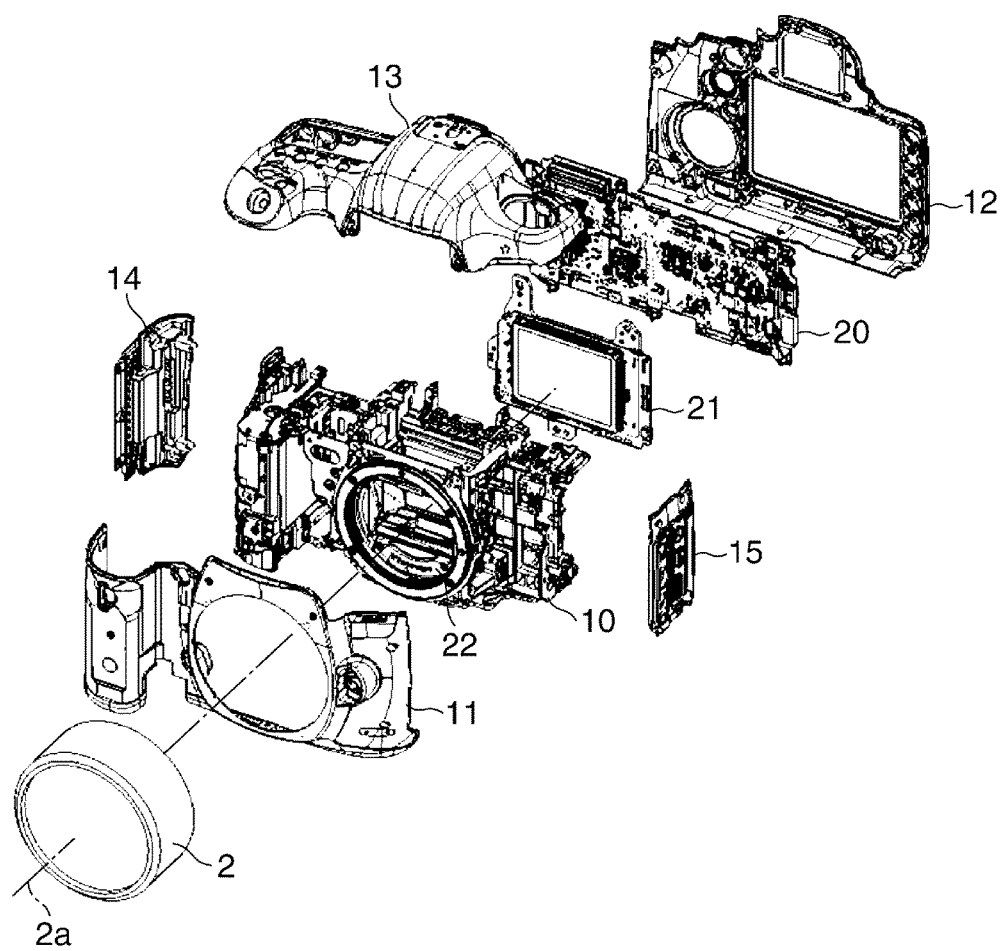
FIG. 2 is an exploded perspective view showing a camera appearing in FIGS. 1A and 1B.

FIG. 2 is an exploded perspective view showing the camera appearing in FIGS. 1A and 1B.

The camera main body 1 has a main body unit 10, and a front side cover 11 is placed in front of (on a front side) of the main body unit 10. A rear side cover 12 is placed in back of (on a rear side) of the main body unit 10. A top side cover 13, a right side cover 14, and a left side cover 15 are placed on a top side, a right side, and a left side, respectively, of the main body unit 10. The front side cover 11, the rear side cover 12, the top side cover 13, the right side cover 14, and the left side cover 15 are exterior covers. The main body unit 10 is covered with the exterior covers, and a control unit 20 and an image pickup unit 21 are held on and fixed to the main body unit 10.

The taking lens 2 mentioned earlier is mounted on the main body unit 10, and the control unit 20 communicates with the taking lens 2 through a mount contact unit 22. It should be noted that an optical image (subject image) is formed on the image pickup unit 21 through the taking lens 2. The image pickup unit 21 then outputs an image signal corresponding to the optical image as will be described later.

Figure 3:
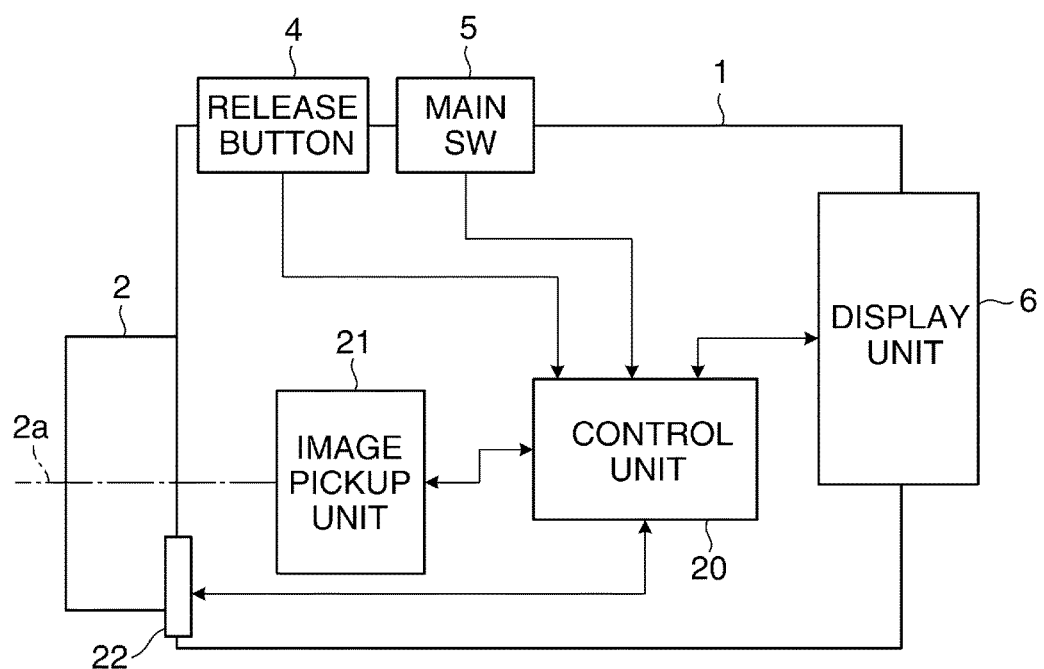
FIG. 3 is a block diagram showing an exemplary arrangement of a control system of the camera appearing in FIGS. 1A and 1B.

FIG. 3 is a block diagram showing an exemplary arrangement of a control system of the camera in FIGS. 1A and 1B.

As described above, the control unit 20 and the image pickup unit 21 are held on and fixed to the main body unit 10. The control unit 20, which is, for example, a microcomputer, controls operation of the camera and stores image data obtained by taking images. The release button 4, the main SW 5, the display unit 6, the image pickup unit 21, and the mount contact unit 22 are electrically connected to the control unit 20.

When the main SW 5 is turned on, the control unit 20 causes the camera main body 1 to start operating. The control unit 20 then communicates with the taking lens 2 through the mount contact unit 22. The control unit 20 controls the taking lens 2 to drive the taking lens 2 along the shooting optical axis 2a so as to attain focus on an image-forming surface (light-incident surface) of the image pickup unit 21.

When the release button 4 is turned on, the control unit 20 controls the image pickup unit 21 to take an image of a subject using the image pickup unit 21. The control unit 20 then displays, on the display unit 6, an image corresponding to image data obtained by the image pickup unit 21.

Figure 4A:
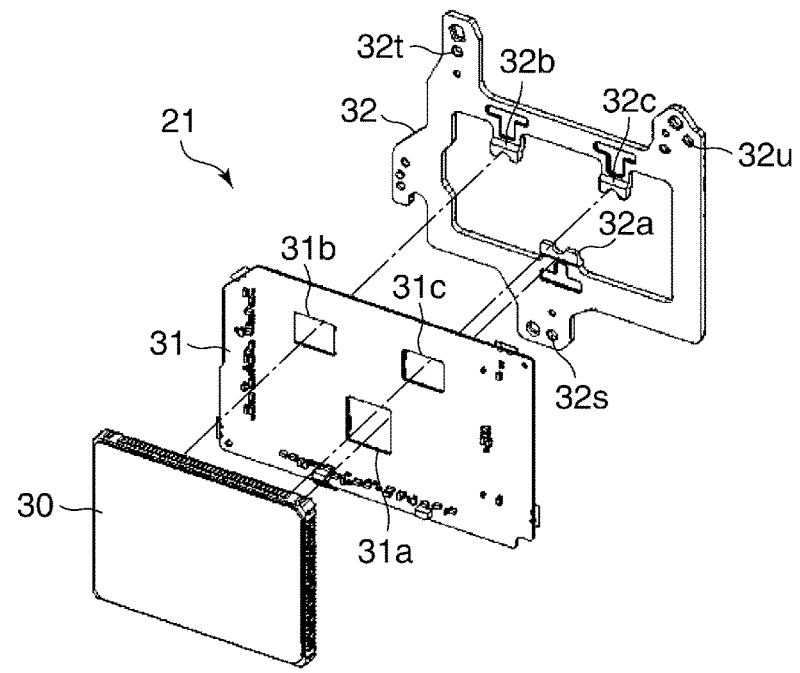
FIGS. 4A and 4B are exploded perspective views showing an arrangement of an image pickup unit appearing in FIG. 2.
Figure 4B:
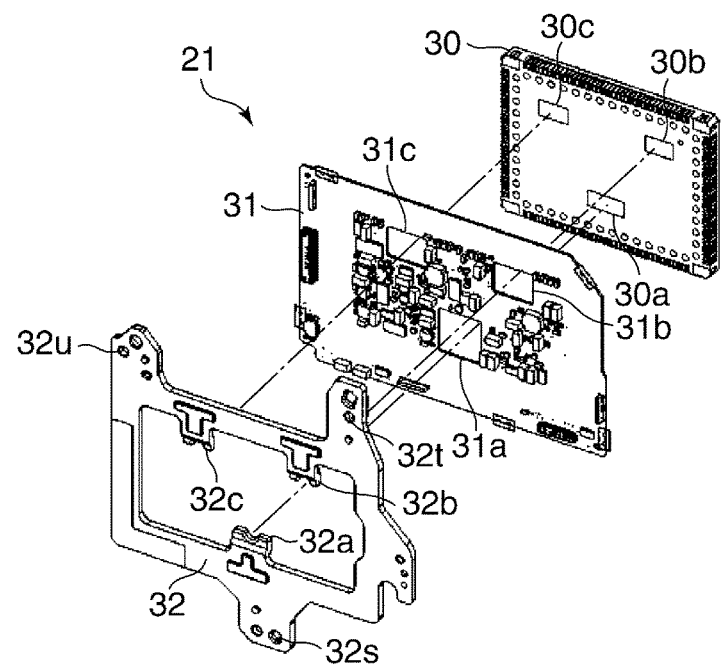

FIGS. 4A and 4B are exploded perspective views showing an exemplary arrangement of the image pickup unit 21 in FIG. 2. FIG. 4A is an exploded perspective view showing the image pickup unit 21 as seen from a front side, and FIG. 4B is an exploded perspective view showing the image pickup unit 21 as seen from a rear side.

The image pickup unit 21 has an image pickup device 30, which photoelectrically converts an optical image and outputs an electric signal (analog signal) corresponding to the optical image. In the example shown in the figures, a CMOS image sensor, for example, is used as the image pickup device 30, but a CCD or CID image sensor may be used.

A lower side holding member fixing portion (holding and fixing portion) 30a, a right side holding member fixing portion 30b, and a left side holding member fixing portion 30c are formed in the image pickup unit 21. The lower side holding member fixing portion 30a, the right side holding member fixing portion 30b, and the left side holding member fixing portion 30c are lands which are formed on a bottom (rear surface: one surface) of the image pickup device 30 and plated with gold. The lower side holding member fixing portion 30a, the right side holding member fixing portion 30b, and the left side holding member fixing portion 30c are electrically connected to ground terminals (GND) provided in the image pickup device 30.

An image pickup board 31 is a multilayer printed board (mounting board) on which high-density wiring is possible. The image pickup device 30 is mounted on a surface of the image pickup board 31 on the taking lens 2 side (that is, the front side). Namely, the image pickup board 31 is a circuit board on which the image pickup device 30 is installed. It should be noted that a conductor pattern is formed on a surface of the image pickup board 31. This conductor pattern is covered with a thin insulating film such as a photoresist solution to prevent shorting of the conductor (board surface layer pattern) and a conductor outside the board.

As shown in FIG. 4A, a lower opening 31a, a right opening 31b, and a left opening 31c are formed in the image pickup board 31. When the image pickup device 30 is mounted on the image pickup board 31, the lower side holding member fixing portion 30a, the right side holding member fixing portion 30b, and the left side holding member fixing portion 30c expose themselves from the lower opening 31a, the right opening 31b, and the left opening 31c, respectively. It should be noted that the lower side opening 31a, the right side opening 31b, and the left side opening 31c have equal to or greater areas than those of the lower side holding member fixing portion 30a, the right side holding member fixing portion 30b, and the left side holding member fixing portion 30c.

A holding member 32 is a metallic member molded by stamping or the like, and an opening is formed in a central part of the holding member 32. As shown in the figures, in a lower side which defines the opening, a lower side fixing portion 32a projected inward is formed by stepped bending. Further, in an upper side which defines the opening, a right side fixing portion 32b and a left side fixing portion 32c projected inward are formed by stepped bending with a predetermined space left therebetween.

The lower side fixing portion 32a, the right side fixing portion 32b, and the left side fixing portion 32c are brought into abutment with the lower side holding member fixing portion 30a, the right side holding member fixing portion 30b, and the left side holding member fixing portion 30c exposed from the lower opening 31a, the right opening 31b, and the left opening 31c, respectively. The lower side holding member fixing portion 30a, the right side holding member fixing portion 30b, and the left side holding member fixing portion 30c are then fixed to the lower side fixing portion 32a, the right side fixing portion 32b, and the left side fixing portion 32c, respectively, by solder.

Further, holding member holding portions 32s, 32t, and 32u are formed in the holding member 32. The holding member 32 is positioned on the main body unit 10 using a positioning dowel (not shown) or the like. After that, fastening members such as screws (not shown) are inserted into the holding member holding portions 32s, 32t, and 32u, causing the holding member 32 to be fixed to the main body unit 10.

It should be noted that although in the example shown in the figure, the holding member 32 is a metallic member, the holding member 32 may be molded using a resin or another material. Further, although in the example described above, the holding member 32 is fixed to the lower side holding member fixing portion 30a, the right side holding member fixing portion 30b, and the left side holding member fixing portion 30c by soldering, the holding member 32 may be fixed to them using a UV hardening resin, a thermosetting resin, an adhesive agent, or the like.

Figure 5A:
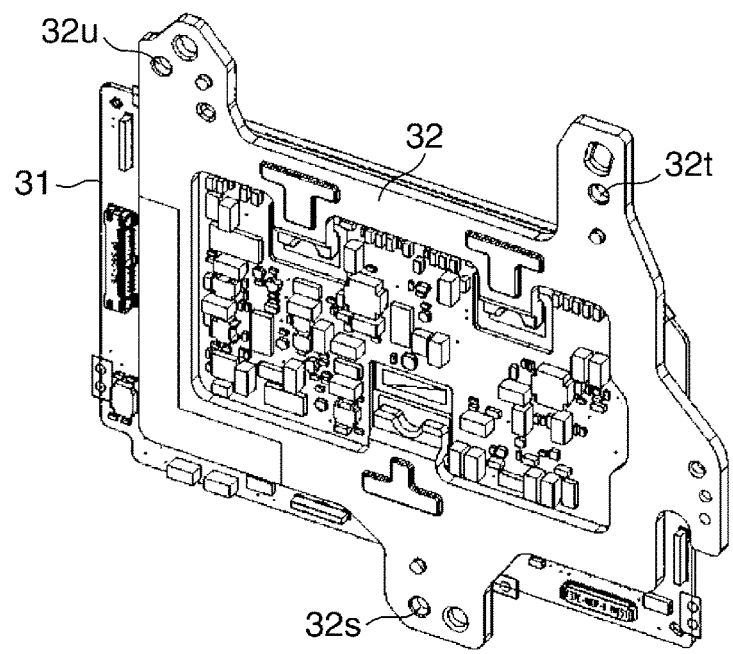
FIGS. 5A and 5B are views (Part 1) useful in explaining how the image pickup device appearing in FIGS. 4A and 4B is mounted on an image pickup board.
Figure 5B:
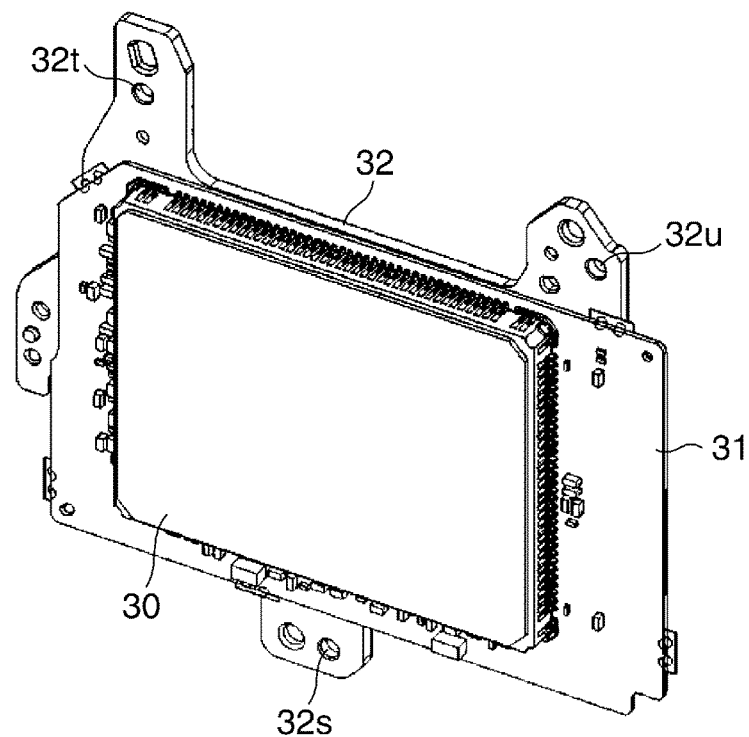
Figure 6A:
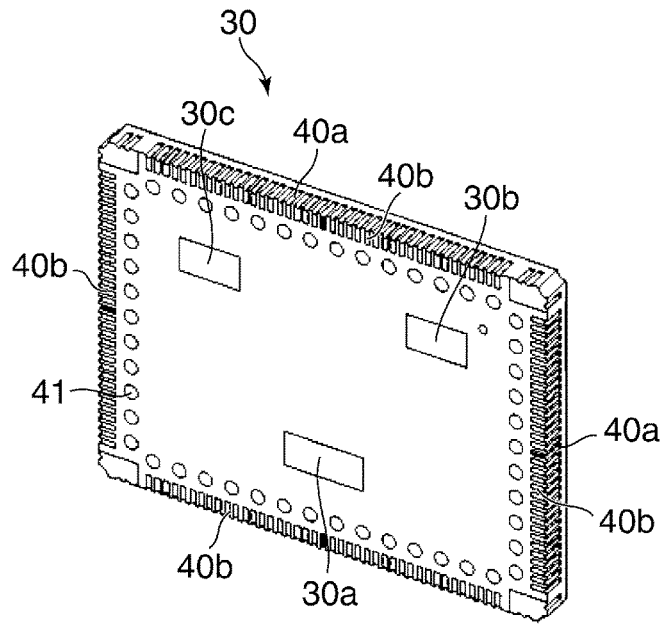
FIGS. 6A to 6C are views (Part 2) useful in explaining how the image pickup device appearing in FIGS. 4A and 4B is mounted on the image pickup board.
Figure 6B:
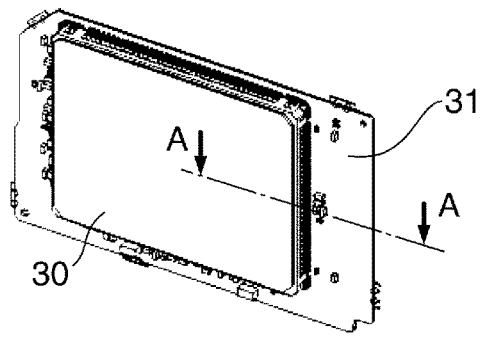
Figure 6C:
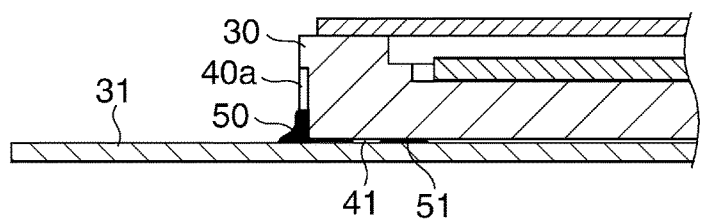

FIGS. 5A and 5B and FIGS. 6A to 6C are views useful in explaining how the image pickup device 30 in FIGS. 4A and 4B is mounted on the image pickup board 31. FIG. 5A is a view showing the image pickup device 30 mounted on the image pickup board 31 as seen from the rear side, and FIG. 5B is a view showing the image pickup device 30 mounted on the image pickup board 31 as seen from the front side. FIG. 6A is a perspective view showing the image pickup device as seen from the rear side, and FIG. 6B is a perspective view showing the image pickup device 30 mounted on the image pickup board 31. FIG. 6C is a cross-sectional view taken along line A-A in FIG. 6B.

As shown in FIGS. 5A and 5B and FIGS. 6A to 6C, side signal terminals 40a and bottom signal terminals 40b are each formed from sides to a bottom (rear surface) of the image pickup device 30. Further, on the bottom of the image pickup device 30, reinforcing terminals 41 are placed inside the bottom signal terminals 40b. As shown in FIG. 6B, the side signal terminals 40a and bottom signal terminals 40b are soldered to the image pickup board 31 using solder 50, and the reinforcing terminals 41 are soldered to the image pickup board 31 using solder 51.

The side signal terminals (second terminal unit) 40a and the bottom signal terminals (first terminal unit) 40b are connected together in an L-shape and formed as terminals with gold-plated surfaces. A predetermined number of terminals with gold-plated surfaces are arranged on each of the four sides of the image pickup device 30. The side signal terminals 40a and the bottom signal terminals 40b connected together in the L-shape are electrically connected to the image pickup board 31 using the solder 50. As a result, a circuit provided in the image pickup device 30 and a circuit placed in the image pick up board 31 are connected together.

The reinforcing terminals 41 are substantially round gold-plated terminals exposed from the bottom of the image pickup board 31, and they are arranged in sequence and substantially parallel to the four sides of the image pickup device 30. It should be noted that the reinforcing terminals 41 prevent stress from being directly applied to the solder 50, and this extends the life of the signal terminals before they are broken apart. The reinforcing terminals 41 are electrically connected to a GND (contact portion) of the image pickup unit 30. Electrically connecting the reinforcing terminals 41 to the image pickup board 31 using the solder 51 connects the GND of the image pickup unit 30 and a GND of the image pickup board 31 together.

Each of the reinforcing terminals 41 has an area equal to or greater than an area of each of the bottom signal terminals 40b. The total number of reinforcing terminals 41 is smaller than that of bottom signal terminals 40b. This increases a soldered area of each reinforcing terminal 41 and enhances a reinforcing effect.

Although in the example shown in the figures, the signal terminals and the reinforcing terminals are arranged in sequence and substantially parallel to all of the four sides of the image pickup device 30, the signal terminals may be arranged along two short sides opposed to each other, and likewise, the reinforcing terminals may be arranged along two long sides opposed to each other. Further, when the signal terminals are arranged along three sides consisting of two short sides opposed to each other and one long side, the reinforcing terminals may be arranged a total of three sides consisting of the two short sides opposed to each other and one long side opposed to the long side along which the signal terminals are arranged. Moreover, although the signal terminals and the reinforcing terminals are arranged in a row along each side, they may be arranged in two or more rows or may be staggered.

Figure 7:
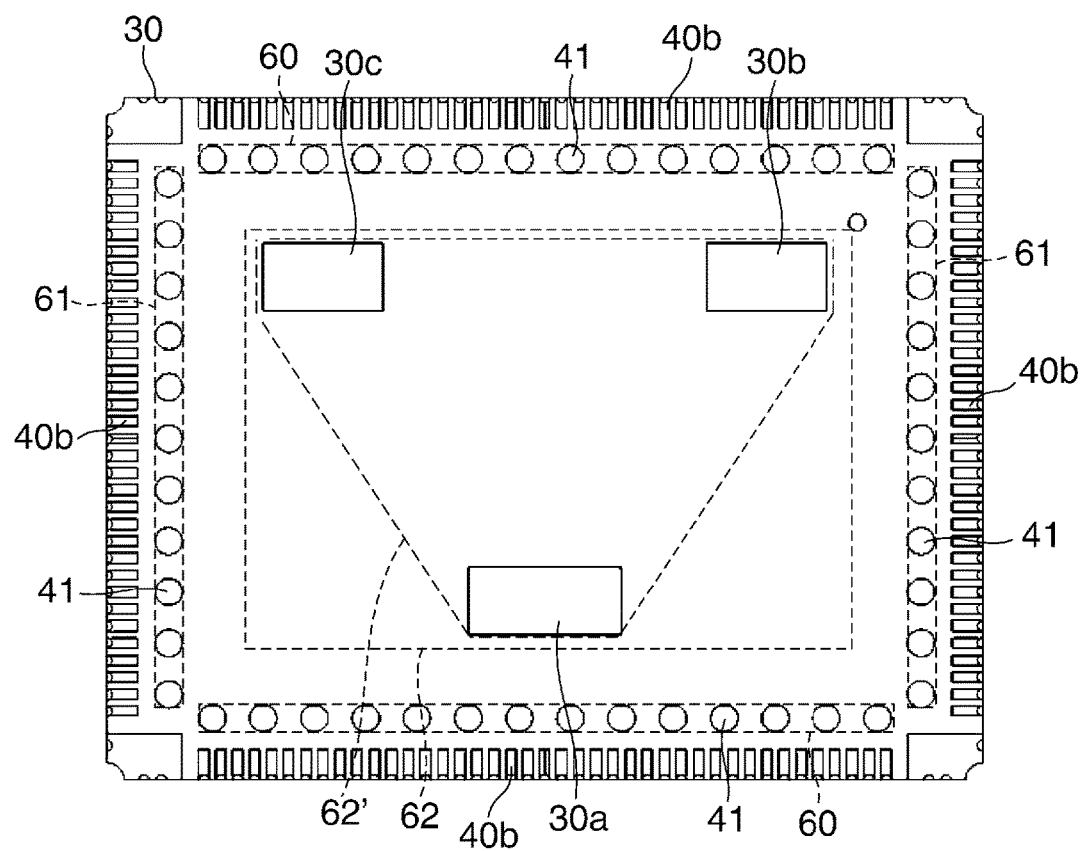
FIG. 7 is a view useful in explaining a terminal layout of the image pickup device appearing in FIGS. 6A to 6C.

FIG. 7 is a view useful in explaining a terminal layout of the image pickup device 30 in FIGS. 6A to 6C.

FIG. 7 shows the image pickup device 30 as seen from a bottom (rear) side. A long-side reinforcing terminal region 60, a short-side reinforcing terminal region 61, and a holding member fixing unit region 62 are defined on the bottom of the image pickup device 30. The long-side reinforcing terminal region 60 and the short-side reinforcing terminal region 61 are arranged along long sides and short sides, respectively, of the image pickup device 30. Namely, each of the long-side reinforcing terminal region 60 and the short-side reinforcing terminal region 61 is a rectangular region defined by tangents connecting outer edges of the reinforcing terminals 41.

The holding member fixing unit region 62 is a region formed by connecting outer peripheries of the lower side holding member fixing portion 30a, the right side holding member fixing portion 30b, and the left side holding member fixing portion 30c to one another. It should be noted that although in the example shown in the figure, the holding member fixing unit region 62 has a rectangular shape, it should not always have a rectangular shape but may have a shape indicated by a reference numeral 62' as long as it is formed by connecting the outer peripheries.

In this case, each of the long-side reinforcing terminal region 60 and the short-side reinforcing terminal region 61 is placed between the bottom signal terminals 50b and the holding member fixing unit region 62. Namely, each of the long-side reinforcing terminal region 60 and the short-side reinforcing terminal region 61 is not placed inside the holding member fixing unit region 62. Further, since the reinforcing terminals 41 have a substantially round shape, that is, the reinforcing terminals 41 have no corners, stress is prevented from being concentrated on a part of each reinforcing terminal 41. As a result, the life of the reinforcing terminals 41 themselves before they are broken apart is extended. This increases reliability of soldering using the solder 50.

It should be noted that where percentages made up by the reinforcing terminals 41 in the long-side reinforcing terminal region 60 and the short-side reinforcing terminal region 61 are shares, the share in the short-side reinforcing terminal region 61 is equal to or higher than the share in the long-side reinforcing terminal region 60.

Thus, increasing the share in the short-side reinforcing terminal region 61 results in an increase in the area of the reinforcing terminals 41 in the short-side reinforcing terminal region 61 which are in contact with the image pickup board 31. Considering that the signal terminals relating to image output are placed along the short sides of the image pickup device 30, heat generated during image output is effectively released from the image pickup device 30 to the image pickup board 31. Also, considering that it is necessary to take measures against noise for image signal output from the signal thermals relating to image output, an increase in the area of contact enhances a grounding effect and reduces noise for image signals.

Figure 8A:
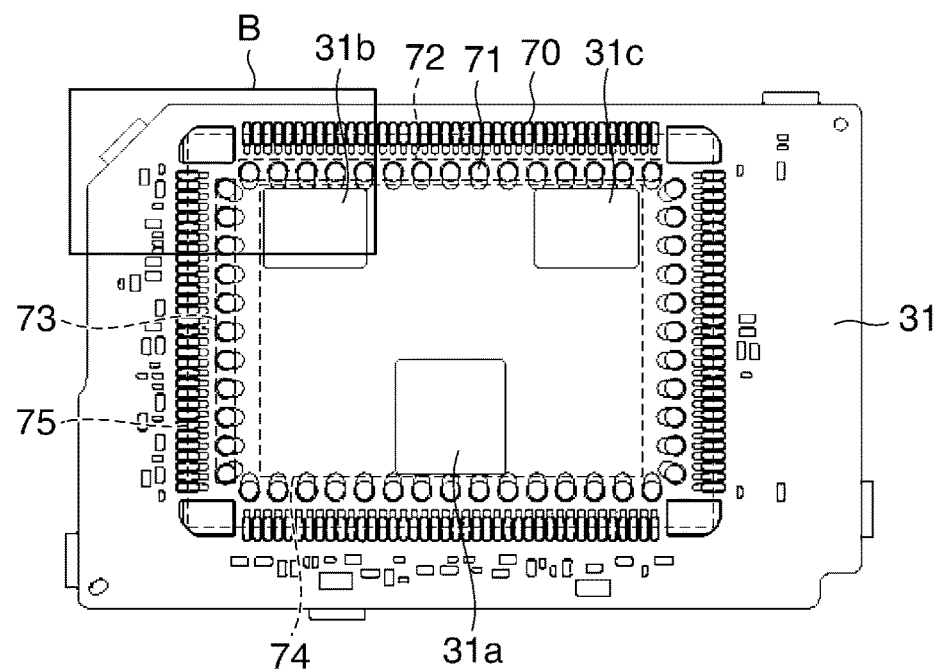
FIGS. 8A and 8B are views useful in explaining a land layout of the image pickup board appearing in FIGS. 4A and 4B.
Figure 8B:
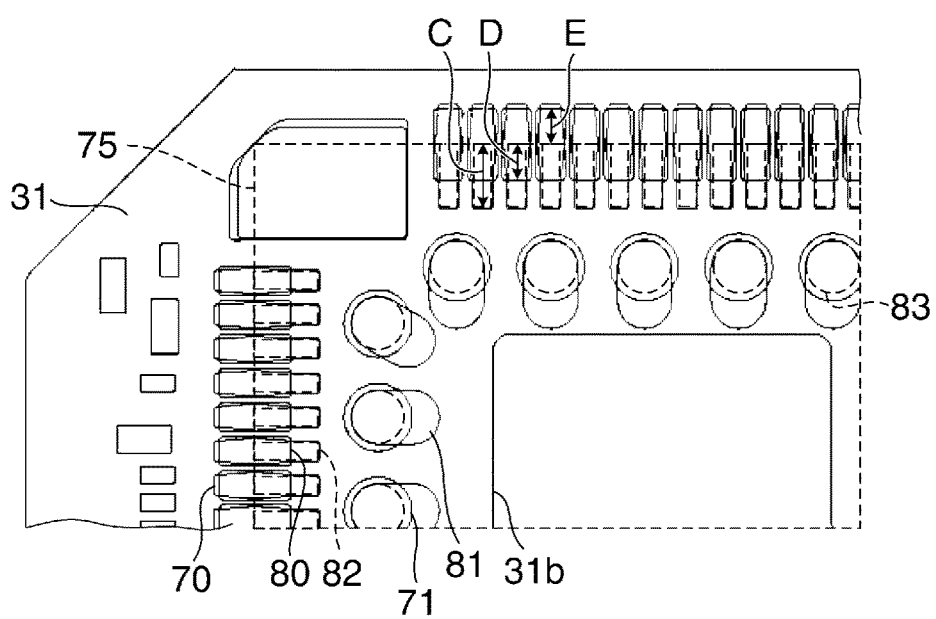

FIGS. 8A and 8B are views useful in explaining a land layout of the image pickup board 31 in FIGS. 4A and 4B. FIG. 8A is a view showing the image pickup device 30 mounted on the image pickup board 31 as seen from the front side, and FIG. 8B is an enlarged view showing a region indicated by a reference symbol B in FIG. 8A.

Referring to FIG. 8A, signal lands 70, reinforcing lands 71, a long-side reinforcing land region 72, a short-side reinforcing land region 73, and a land placement prohibited region 74 are defined on the image pickup board 31. The image pickup device 30 is mounted in a mounting range (mounting region) 75 defined on the image pickup board 31.

Referring to FIG. 8B, photoresist opening regions 80 are formed in the signal lands 70, and photoresist opening regions 81 are formed in the reinforcing lands 71. Bottom signal terminal regions 82 and reinforcing terminal regions 83 for the image pickup device 30 are configured on the image pickup board 31.

As shown in the figures, when the image pickup device 30 is mounted in the mounting region 75, the signal lands 70 and the reinforcing lands 71 are placed at respective positions opposed to the bottom signal terminals 40b and the reinforcing terminals 41 of the image pickup device 30. The signal lands 70 and the reinforcing lands 71 are lands formed by copper foils in a board surface layer and arranged in sequence along the four sides of the image pickup board 31.

The bottom signal terminals 40b are electrically connected to the respective signal lands 70 using the solder 50. This connects the circuit provided in the image pickup device 30 to the circuit placed on the image pickup board 31. The reinforcing lands 71 have a substantially round shape, and an area of each reinforcing land 71 is equal to or greater than that of each signal land 70. The total number of reinforcing lands 71 is smaller than that of signal lands 70. This increases a soldered area of each reinforcing land 71 and enhances a reinforcing effect. The reinforcing terminals 41 are electrically connected to the respective reinforcing lands 71 using the solder 51. This connects the GND of the image pickup unit 30 and the GND of the image pickup board 31 together.

In the example shown in the figures, the signal lands 70 and the reinforcing lands 71 are arranged in sequence and substantially parallel to all of the four sides of the image pickup board 31. On the other hand, the signal lands 70 and the reinforcing lands 71 may be placed in a different manner depending on how the side signal terminals 40a and the bottom signal terminals 40b of the image pickup device 30 are laid out. In either way, the signal lands 70 and the reinforcing lands 71 are placed along two or more sides of the image pickup board 31 according to how the side signal terminals 40a and the bottom signal terminals 40b of the image pickup device 30 are laid out. Further, although in the example shown in the figures, the signal lands 70 and the reinforcing lands 71 are arranged in a row along each side, they may be arranged in two or more rows or may be staggered.

Each of the long-side reinforcing land region 72 and the short-side reinforcing land region 73 is a rectangular region defined by tangents connecting outer edges of the reinforcing lands 71 placed on long and short sides of the image pickup board 31. The land placement prohibited region 74 is a region defined by outer peripheries of the lower opening 31a, the right opening 31b, and the left opening 31c described above. On this occasion, the long-side reinforcing land region 72 and the short-side reinforcing land region 73 are placed between the signal lands 70 and the land placement prohibited region 74. Namely, the long-side reinforcing land region 72 and the short-side reinforcing land region 73 are not placed inside the land placement prohibited region 74.

Where percentages made up by the reinforcing lands 71 in the long-side reinforcing land region 72 and the short-side reinforcing land region 73 are shares, the share in the short-side reinforcing land region 73 is equal to or higher than the share in the long-side reinforcing land region 72.

Thus, increasing the share in the short-side reinforcing land region 73 results in an increase in the area of the reinforcing terminals 41 in the short-side reinforcing terminal region 61 which are in contact with the image pickup board 31. As described above, considering that the signal terminals relating to image output are placed along the short sides of on the image pickup device 30, an increase in the area of contact leads to efficient release of heat, which is generated during image output, from the image pickup device 30 to the image pickup board 31. Also, considering that it is necessary to take measures against noise for image signals output from the signal thermals relating to image output, an increase in the area of contact enhances a grounding effect and reduces noise for image signals.

The photoresist opening regions 80 and 81 described above are formed in surfaces of the signal lands 70 and the reinforcing lands 71, respectively. The photoresist opening regions 80 and 81 are not coated with thin insulating films (such as photoresist), but conductor patterns made of copper foils in the board surface layer or primary coatings made of glass epoxy or the like are exposed from the photoresist opening regions 80 and 81.

Each photoresist opening regions 81 widens its range on an opposite side of a side opposed to the signal lands 70, and the range of each photoresist opening region 81 is wider than that of each reinforcing land 71. The photoresist opening regions 81 are configured independently of other resist opening regions.

With the above arrangement, even if printed solder paste melts into a liquid state when the image pickup device 30 is mounted on the image pickup board 31 by reflow soldering, the molten solder is enclosed by surface tension of the insulating films at their opening ends. This prevents the molten solder from flowing out in unintended directions.

As a result, formation of solder balls is prevented to avoid occurrence of poor mounting which would occur due to solder bridging with other terminals and affect reliability of soldering such as variations in the amount of solder and joining strength of soldered portions.

As shown in FIG. 8B, in the mounting region 75, each photoresist opening region 80 is shorter than each bottom signal terminal region 82 (see arrows C and D). Further, in each resist opening region 80, an area outside the image pickup device 30 (that is, the mounting region 75) and an area inside the mounting region 75 are substantially equal where an end of the mounting region 75 is assumed to be a center.

When the image pickup device 30 is mounted on the image pickup board 31 by reflow soldering, solder tries to stay between the bottom signal terminals 40b and the signal lands 70 due to surface tension, but is pushed out externally from the image pickup device 30 due to self weight of the image pickup device 30. This causes filet such as the solder 50 to be formed between the side signal terminals 40a and the signal lands 70. This increases the strength with which the image pickup device 30 and the image pickup board 31 are joined together with solder.

As for the photoresist opening regions 80, if the area outside the image pickup device 30 is greater than the area inside the image pickup device 30, solder would go to filet, causing a shortage in the amount of solder. The shortage in the amount of solder would make it difficult to form solder filet having sufficient strength. On the other hand, if the area outside the image pickup device 30 is smaller than the area inside the image pickup device 30, solder that has been pushed out cannot be stored due to surface tension, causing shorting with the neighboring signal lands 70 or the like.

To prevent the situations described above, the amount of solder pushed out externally from the image pickup device 30 and the amount of solder stored by surface tension of the photoresist opening regions 80 located outside the image pickup device 30 need to be brought into balance. In the photoresist opening regions 80, the amount of solder is brought into balance by making an area outside the image pickup device 30 and an area inside the mounting region 75 substantially equal where an end of the mounting region 75 is assumed to be a center.

Configuring the image pickup device 30 and the image pickup board 31 as described above ensures reliability of soldering even if the image pickup device 30 is a type having signal terminals that can be soldered in sequence from sides to a bottom (LLC-PKG). Namely, warpage of the image pickup device 30 and the image pickup board 31 is prevented, and also, stress due to expansion and shrinking arising from, for example, repetition of rapid temperature changes is prevented from being directly applied to the solder 50 of the signal terminals. This extends the life of the solder 50 of the signal terminals before they are broken apart, and therefore increases reliability of soldering.

As described hereinabove, in the embodiment of the present invention, reliability of soldering is ensured without reinforcement using any additional special members or fixing with an adhesive agent or the like.

It should be understood that although the preferred embodiment of the present invention has been described, the present invention is not limited to the embodiment, the assembly sequence, the way of assembly, and so forth described above, but may be modified and changed without departing from the spirits of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-138593, filed Jul. 13, 2016 which is hereby incorporated by reference herein in its entirety.

What is claimed is:

1. An image pickup device that outputs an image signal corresponding to an optical image, comprising:
    signal terminals configured to be placed on one surface of the image pick device and soldered to a mounting board on which the image pickup device is to be mounted;
    reinforcing terminals configured to be provided on the one surface, on which the signal terminal is placed, and reinforce the image pickup device; and
    a holding fixing unit configured to hold the image pickup device,
    wherein when the image pickup device is mounted on the mounting board, the reinforcing terminals are located between the signal terminals and the holding fixing unit.

2. The image pickup device according to claim 1, wherein the reinforcing terminals are arranged along at least two sides of the image pickup device.

3. The image pickup device according to claim 1, wherein the signal terminals comprise first terminal units formed on the one surface and second terminal units connected to the first terminal units and formed on a side extending up to the one surface, and
    wherein the first terminal units are soldered to the mounting board.

4. The image pickup device according to claim 3, wherein the holding fixing unit is fixed to a holding member that holds the image pickup device at a location inside the first terminal units.

5. The image pickup device according to claim 3, wherein an area of each of the reinforcing terminals is equal to or greater than an area of each of the first terminal units, and the number of reinforcing terminals is smaller than the number of first terminal units.

6. The image pickup device according to claim 1, wherein the reinforcing terminals have a substantially round shape.

7. The image pickup device according to claim 1, wherein the reinforcing terminals are electrically connected to a ground unit provided in the image pickup device.

8. The image pickup device according to claim 1, wherein the reinforcing terminals are arranged in at least two rows along one side of the image pickup device.

9. The image pickup device according to claim 1, wherein the reinforcing terminals are arranged along a long side and a short side of the image pickup device, and where percentages made up by the reinforcing terminals in a first rectangular region defined by tangents connecting outer edges of the reinforcing terminals arranged along the long side is a first share, and percentages made up by the reinforcing terminals in a second rectangular region defined by tangents connecting outer edges of the reinforcing terminals arranged along the short side is a second share, the second share is equal to or higher than the first share.

10. A mounting board on which an image pickup device that outputs an image signal corresponding to an optical image is mounted, comprising:
   signal lands and reinforcing lands on which signal terminals and reinforcing terminals, respectively, provided in the image pickup device are positioned,
   wherein photoresist opening regions configured in the reinforcing lands broaden their range on an opposite side of a side opposed to the signal lands and have a wider range than the reinforcing lands,
   wherein the signal terminals are placed on one surface of the image pick device and soldered to the mounting board on which the image pickup device is to be mounted;
   wherein the reinforcing terminals are provided on the one surface, on which the signal terminal is placed, and reinforce the image pickup device; and
   wherein the image pickup device further comprises a holding fixing unit that holds the image pickup device, and
   wherein when the image pickup device is mounted on the mounting board, the reinforcing terminals are located between the signal terminals and the holding fixing unit.

11. The mounting board according to claim 10, wherein each of the photoresist opening regions configured in the reinforcing lands are independent from resist opening regions configured in the signal lands and resist opening regions configured in other reinforcing lands.

12. The mounting board according to claim 10, wherein an area of each of the reinforcing lands is equal to or greater than an area of each of the signal lands, and the number of reinforcing lands is smaller than the number of signal lands.

13. The mounting board according to claim 10, wherein the reinforcing lands have a substantially round shape.

14. The mounting board according to claim 10, wherein the reinforcing lands are electrically connected to a ground unit provided in the image pickup device when the image pickup device is mounted on the mounting board.

15. The mounting board according to claim 10, wherein the reinforcing lands are arranged in at least two rows along one side of the image pickup device.

16. The mounting board according to claim 10, wherein the reinforcing lands are arranged along a long side and a short side of the mounting board, and where percentages made up by the reinforcing lands in a first land region defined by tangents connecting outer edges of the reinforcing lands arranged along the long side is a first share, and percentages made up by the reinforcing lands in a second land region defined by tangents connecting outer edges of the reinforcing lands arranged along the short side is a second share, the second share is equal to or higher than the first share.

17. The mounting board according to claim 10,
   wherein a mounting region in which the image pickup device is to be mounted is defined on the mounting board, and
   wherein in the mounting region, the photoresist opening regions configured in the signal lands are smaller than regions of the signal terminals.

18. The mounting board according to claim 10,
   wherein a mounting region in which the image pickup device is to be mounted is defined on the mounting board, and
   wherein the photoresist opening regions configured in the signal lands are configured so that an area outside the image pickup device and an area inside the mounting region are substantially equal where an end of the mounting region is assumed to be a center.

* * * * *